(12) United States Patent
Russell et al.

(10) Patent No.: US 9,942,542 B2
(45) Date of Patent: Apr. 10, 2018

(54) METHOD FOR RECOGNIZING A BAND-LIMITING MALFUNCTION OF A CAMERA, CAMERA SYSTEM, AND MOTOR VEHICLE

(71) Applicant: Connaught Electronics Ltd., Tuam, County Galway (IE)

(72) Inventors: Laura Russell, Cork (IE); Brian Michael Thomas Deegan, Tuam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 0 days.

(21) Appl. No.: 15/379,599

(22) Filed: Dec. 15, 2016

(65) Prior Publication Data

US 2017/0180724 A1  Jun. 22, 2017

(30) Foreign Application Priority Data

Dec. 21, 2015 (DE) .......................... 10 2015 122 415

(51) Int. Cl.

| | |
|---|---|
| *H04N 17/00* | (2006.01) |
| *G06T 5/10* | (2006.01) |
| *H04N 5/225* | (2006.01) |
| *H04N 5/235* | (2006.01) |
| *H04N 7/18* | (2006.01) |
| *G06T 7/30* | (2017.01) |
| *B60R 11/04* | (2006.01) |

(52) U.S. Cl.
CPC ............ *H04N 17/002* (2013.01); *G06T 5/10* (2013.01); *G06T 7/30* (2017.01); *H04N 5/2256* (2013.01); *H04N 5/2351* (2013.01); *H04N 7/183* (2013.01); *B60R 11/04* (2013.01); *G06T 2207/20024* (2013.01); *G06T 2207/20048* (2013.01); *G06T 2207/30252* (2013.01)

(58) Field of Classification Search
CPC .. H04N 17/002; H04N 5/2256; H04N 5/2351; H04N 7/183; G06T 5/10
See application file for complete search history.

(56) References Cited

U.S. PATENT DOCUMENTS

| | | | |
|---|---|---|---|
| 2004/0136605 A1* | 7/2004 | Seger .................. | H04N 5/20 382/274 |
| 2007/0258707 A1* | 11/2007 | Raskar ................. | G03B 17/00 396/52 |
| 2011/0085051 A1* | 4/2011 | Chi ...................... | H04N 5/2254 348/222.1 |

(Continued)

*Primary Examiner* — Christopher Findley
(74) *Attorney, Agent, or Firm* — Osha Liang LLP

(57) ABSTRACT

The invention relates to a method for recognizing a band-limiting malfunction of a camera (3) of a motor vehicle (1), in which during the operation of the motor vehicle (1) an image (12) of a measurement object (9), which is external to the motor vehicle, is captured by means of the camera (3) arranged on the motor vehicle (1), and in the image (12) a point spread function (14) is determined on the basis of a brightness distribution (16) along a profile through a pixel with a brightness, which exceeds a brightness threshold value, of the measurement object (13) shown in the image (12), and on the basis of the determined point spread function (14) a property value of a property of the camera (3) is determined, and the band-limiting malfunction of the camera (3) is recognized, in case the property value of the camera (3) is smaller than a property threshold value.

14 Claims, 2 Drawing Sheets

(56) References Cited

U.S. PATENT DOCUMENTS

Figure 1:
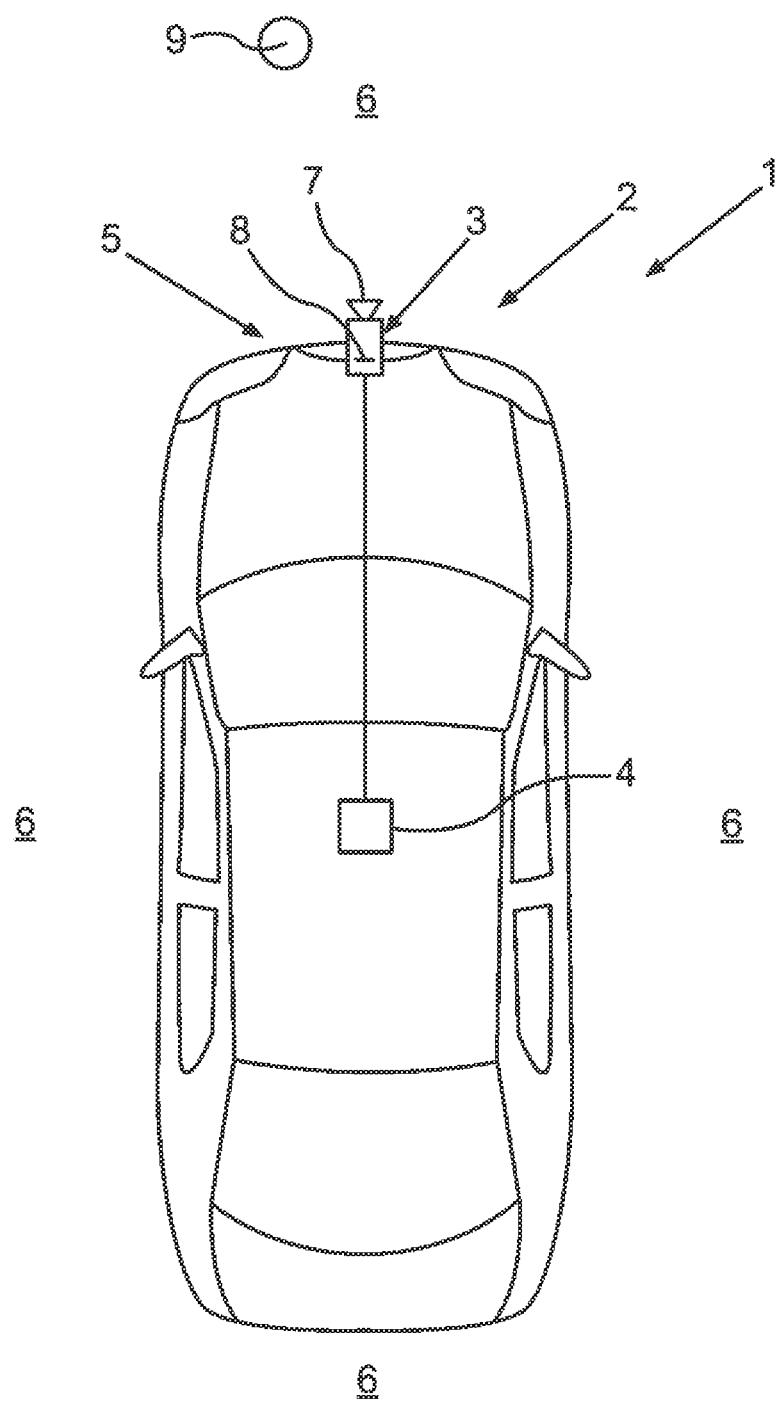

| | | | | |
|---|---|---|---|---|
| 2011/0267482 A1* | 11/2011 | Wetzstein | ............... | G06T 5/50 348/218.1 |
| 2012/0207348 A1* | 8/2012 | Saito | ............... | G08G 1/04 382/103 |
| 2014/0064610 A1* | 3/2014 | Matsushima | ............... | G06K 9/36 382/162 |
| 2014/0160325 A1* | 6/2014 | Hirai | ............... | G06T 5/003 348/252 |
| 2014/0247354 A1* | 9/2014 | Knudsen | ............... | B60R 1/00 348/148 |
| 2016/0080727 A1* | 3/2016 | Komatsu | ............... | H04N 13/0037 348/49 |

\* cited by examiner

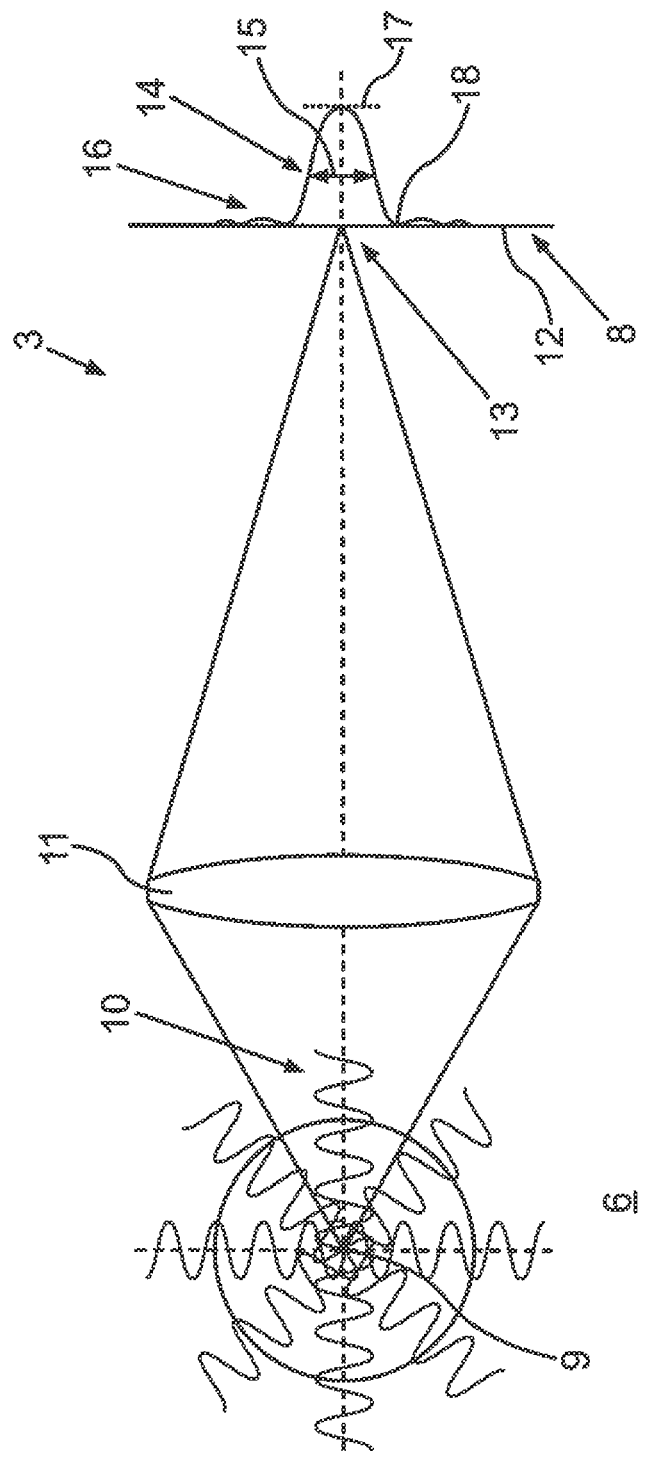

METHOD FOR RECOGNIZING A BAND-LIMITING MALFUNCTION OF A CAMERA, CAMERA SYSTEM, AND MOTOR VEHICLE

The invention relates to a method for recognizing a band-limiting malfunction of a camera of a motor vehicle. An image of a measurement object, which is external to the motor vehicle, is captured by means of the camera arranged on the motor vehicle. The invention also relates to a camera system for a motor vehicle, as well as a motor vehicle comprising a camera system.

Methods for recognizing a band-limiting malfunction of a camera are known from the prior art. A function is band-limited, if it does not contain any frequency components above a certain frequency. Thus a resolution of an image can be restricted by the band-limiting malfunction. The camera can for instance be examined under laboratory conditions as to which resolution can be achieved by the camera, and whether this deviates from an expectation value due to the band-limiting malfunction. For the determination of the resolution of the camera under laboratory conditions for instance a Siemens star can be used.

It is the task of the invention to provide a method, a camera system, as well as a motor vehicle, by which or in which a band-limiting malfunction of a camera can be determined at even less effort but still with precision.

This task according to the invention is solved by a method, by a camera system as well as by a motor vehicle having the features according to the respective independent claims.

In a method according to the invention a band-limiting malfunction of a camera of a motor vehicle is recognized. During the operation of the motor vehicle an image of a measurement object, which is external to the motor vehicle, is captured by means of the camera arranged on the motor vehicle, in the image a point spread function on the basis of a brightness distribution along a profile is determined through a pixel of the measurement object shown in the image. The pixel has a brightness, which exceeds a brightness threshold value. On the basis of the determined point spread function a property value of a property of the camera is determined. The band-limiting malfunction of the camera is recognized, in case the property value of the camera is smaller than a property threshold value.

By capturing the measurement object and determining the point spread function of the measurement object shown in the image the band-limiting malfunction of the camera can be determined at little effort but still with precision. Thus the band-limiting malfunction of the camera is determined during operation of the motor vehicle and in particular not under laboratory conditions.

In known methods for recognizing a band-limiting malfunction the camera is examined under laboratory conditions, i.e. not during the operation of the motor vehicle. In the present case the camera is already arranged on the motor vehicle and the motor vehicle is operated according to the commonly envisaged use.

During the operation of the motor vehicle means in particular that the manufacture of the motor vehicle has already been completed, it has been delivered to the user, and is used according to its common use. During the operation of the motor vehicle does not mean that a main driving unit of the motor vehicle needs to be active or the motor vehicle necessarily needs to be moved during the performance of the method according to the invention.

The measurement object, which is external to the motor vehicle, in this connection can be arranged in an environmental area of the motor vehicle or be arranged on the motor vehicle itself. Thus the measurement object, which is external to the motor vehicle, can also be configured as a motor vehicle component of the motor vehicle. Additionally or alternatively the measurement object can also be imprinted upon the motor vehicle component.

Through recognition of the band-limiting malfunction of the camera consequently during the operation of the motor vehicle it can be found out that the camera currently provides images with a lower resolution than this was the case during an earlier operation of the motor vehicle or than was the case upon delivery of the motor vehicle to the user. Accordingly, for instance the band-limiting malfunction of the camera can be given for instance through influential factors such as diffraction phenomena on diaphragms of the camera and/or imaging errors of the camera and/or influences of en image sensor of the camera and/or influences of an aperture of the camera.

For recognizing the band-limiting malfunction of the camera now the image with the measurement object, which is external to the motor vehicle, is captured. Of the measurement object shown in the image a point spread function is determined. The point spread function (PSF) in optics and in image processing describes the effect of band-limiting influential factors. The point spread function indicates how an idealized, dot-shaped object would be imaged through a system, in the present case the camera The form of the point spread function can for instance be given irrespective of the original location of the ideal, dot-shaped object. In this case an overall response of the system can be calculated as product of the point spread functions or point responses of the object broken down into its dots. The point spread function is preferably determined on the basis of the brightness distribution along the profile through the brightest pixel of the measurement object shown in the image. The profile is in particular determined by brightness values or intensity values, which are present on a, preferably straight, line through the shown measurement object in the image plane. In other words, through the point spread function it can be determined how accurately a difference between light and dark can be imaged by the camera. This means how many pixels of an image sensor of the camera are required to image the steep difference between light and dark. Accordingly, the difference between light and dark of the measurement object would be ideally imaged if an edge of the point spread function would perform an infinitely steep jump or if the point spread function would be given as Dirac delta function. However, commonly this is not the case.

The determining of the point spread function can for instance also be effected by determining on the basis of the imaged measurement object an edge spread function (ESF) and by determining on the basis of the edge spread function, in particular by the first derivation of the edge spread function, a line spread function (LSF). The line spread function corresponds to the convolution from the input signal of a line image of the image with the point spread function. For this reason the response of the lens of the camera to a point of light from the environmental area of the motor vehicle is referred to as point spread function.

The property threshold value of the property of the camera can accordingly for instance be characterized by an increase of the point spread function. The property value of the property of the camera, however, can also be characterized by a width of the point spread function relative to its abscissa, which for instance has the unit pixels or image sensor elements.

In particular the brightness distribution along a profile is determined through the brightest pixel of the measurement object shown in the image. The brightness threshold value accordingly is determined in such a way that the profile is made to extend through the brightest pixel of the measurement object. Thereby the spot of the measurement object with the greatest contrast between light and dark can be used for determining the point spread function. The point spread function determined in this way is particularly informative.

In particular it is envisaged that as the property of the camera an achievable resolution of the camera is determined, and the band-limiting malfunction of the camera is recognized, in case the achievable resolution of the camera, which represents a property value, is smaller than a resolution threshold value characterizing the property value. By the achievable resolution the effective resolution of an image captured by means of the camera is described. Thus, the achievable resolution of the camera expresses in how much detail the environmental area of the motor vehicle captured by the camera can be sampled. In this connection the achievable resolution is also described as ground sampling distance (GSD). By the fact that the band-limiting malfunction of the camera is recognized, in case the achievable resolution is smaller than the resolution threshold value, it can be recognized that the camera now can only image objects from a certain size in detail. For instance a notification can be issued to the user of the motor vehicle, in order to point out that the band-limiting malfunction is given. The motor vehicle thereby can be operated more safely.

Preferably it is envisaged that the achievable resolution of the camera is determined in dependence on a width of the brightness distribution half-way up the height between the intensity maximum of the brightness distribution and the intensity minimum of the brightness distribution. The brightness distribution preferably is determined along the profile in the image. Half the height between intensity maximum and intensity minimum (FWHM—Full Width Half Maximum) leads to it that the point spread function can be determined more effectively. However, alternatively the width of the point spread function can also be determined at other heights between the intensity maximum and the intensity minimum.

Further it is preferably envisaged that the measurement object is provided as test pattern and/or as light, in particular radiated in dot-shaped manner, of a luminous light source. The test pattern in this connection can be configured in such a way that the point spread function can be determined thereby. Accordingly, the test pattern preferably has a strong contrast, such as at least one black and at least one white stripe. Also by the luminous light source the measurement object can be provided. Preferably the light source is located at a greater distance from the motor vehicle than the predetermined distance. The luminous light source is used as the measurement object preferably at night. This renders the desired strong contrast between the light source and the background of the light source. In particular by the dot-shaped light source the point spread function can be determined at little effort. Thus the light of the light source, which is radiated in a dot-shaped manner, can be imaged for instance as bright dot in the image and on the basis of the bright dot then the point spread function can be determined. In this connection the light from the light source, which is perceptible in dot-shaped manner from the perspective of the camera, is used in particular as a whole, in order to generate the point spread function, in particular several intensity values of the bright dot in the image represent the maximum of the point spread function. The profile thereby extends two-dimensionally in the image plane of the image over the entire bright dot in the image, i.e. over all intensity values of the bright dot.

Further preferably it is envisaged that the test pattern is provided in an environmental area of the motor vehicle and/or arranged on a motor vehicle component of the motor vehicle. Thus the test pattern can be attached for instance to a spot, which is captured by the camera whilst the motor vehicle is parked in darkness or during daylight. The test pattern consequently can for instance be arranged on a wall of a garage of the motor vehicle, which is captured by the camera. Thereby the method according to the invention can be performed on a regular basis, for instance daily, in order to recognize the band-limiting malfunction of the camera at an early stage. The test pattern, however, can also be arranged on the motor vehicle component of the motor vehicle. Thus the test pattern can be arranged for instance on a bodywork of the motor vehicle or be incorporated therein. The test pattern, however, can also be imprinted upon the motor vehicle component. Thereby then the method according to the invention can be performed at any point in time during the operation of the motor vehicle. The test pattern is preferably provided as a static object, which, in particular relative to the motor vehicle, does not move. The test pattern can either be given as known calibration target or else as unknown calibration target, which is spontaneously determined for the respective measuring process.

Further it is preferably envisaged that the light of the light source is generated by an illumination unit of a further motor vehicle in an environmental area of the motor vehicle and/or by a street lighting in the environmental area. Preferably, the light source is located at a larger distance from the motor vehicle than the predetermined distance. Further preferably the illumination unit of the further motor vehicle and/or the street lighting is captured by the camera at low light conditions, in particular at night. This renders a high contrast between the light source shown in the image and the environmental area serving as background. The point spread function can thereby be determined more accurately. Both the illumination unit and also the street lighting thereby are preferably imaged as dot-shaped light source in the image.

In a further embodiment it is preferably envisaged that a change in the position of the motor vehicle and/or a change in the position of the measurement object is determined, and the image of the measurement object is only captured, in case the change in the position of the motor vehicle and/or the change in the position of the measurement object is smaller than a position threshold value. The change in the position of the motor vehicle can for instance be determined on the basis of a velocity of the motor vehicle and/or a steering angle of the motor vehicle. Further the change in the position of the measurement object and/or the change in the position of the motor vehicle can be determined in dependence on an image sequence. Thus in the image sequence for instance consecutive single images can be compared. In this way for instance a difference between the consecutive single images of the image sequence can be determined and thereby a conclusion as to the change in the position of the motor vehicle and/or the change in the position of the measurement object can be drawn. For examining the image sequence with regard to the change in the position of the motor vehicle and/or the change in the position of the measurement object for instance also a method according to the optical flow can be used. Preferably the image for determining the point spread function can then be captured, if the motor vehicle is moved below a velocity threshold value and/or if the measurement object is positioned at a larger distance than a distance threshold value. The distance threshold then is for instance reached, if a central point of the measurement object over a certain number of single images of the image sequence is given in unchanged position. This is advantageous, since the point spread function thereby is determined accurately and reliably, whereby in turn the band-limiting malfunction is recognized accurately and reliably.

In a further embodiment it may be envisaged that the measurement object shown in the image is determined automatically by means of a method of machine vision in the image. Thus for instance an object recognition method can be used, in order to automatically determine a measurement object known in advance or a measurement object unknown in advance in the image. By the method of machine vision the measurement object accordingly is identified automatically in the image. By means of the method of machine vision also several measurement objects in the image can be determined. Thus there are already front light detection methods, street light detection methods, or similar algorithms, which for the purpose of automatic determining of the measurement object in the image can be adapted. By the automatic determining of the measurement object in the image the recognition of the band-limiting malfunction can be performed with leas effort and faster.

In particular it is envisaged that on the basis of the determined property value an image enhancement filter for the camera is generated, and at least one image consecutive to the image is adapted by an image enhancement filter. Thus on the basis of a determined property value the image enhancement filter can be designed. In simple terms, by the image enhancement filter consequently an error caused by the band-limiting malfunction of the camera is reduced, in particular compensated for. The image enhancement filter then is applied to at least the further image consecutive to the image and leads to it that the further image with regard to the effects of the band-limiting malfunction is corrected at least partly. The application of the image enhancement filter occurs on the software side. The application of the image enhancement filter accordingly is in particular part of an image enhancement program by means of which the further image is for instance post processed. Accordingly, it is advantageous that by the image enhancement filter again an enhanced quality for recordings with the camera can be achieved. Further by the application of the image enhancement filter by means of a program an immediate response is possible after recognition of the band-limiting malfunction, since merely a step post processing the further image needs to be considered when providing the further image.

Further it may be envisaged that on the basis of the determined property value an image enhancement filter for the camera is selected from an image processing filter collection, and at least one further image consecutive to the image is adapted by the image enhancement filter. Thus, for instance in the motor vehicle and/or on a server, which is, for example wirelessly, connected with the motor vehicle and arranged at a remote distance from the motor vehicle, a database is kept as the image processing filter collection. If now the method according to the invention is performed and the band-limiting malfunction of the camera recognized, on the basis of the property value provided by the point spread function an image enhancement filter suitable for the respective situation can be selected from the image processing filter collection can be selected, in order to then apply this selected image enhancement filter to the further image. Thereby for instance the step of the filter design can be reduced to a single application. Thus the filter design needs to be performed only once until the necessary image enhancement filters are established in the image processing filter collection. The image processing filter collection then can for instance also be provided for several motor vehicles. Advantageous is the fast availability of the image processing filter and little effort required in generating the image processing filter.

In a further embodiment it may be envisaged that the image enhancement filter is determined in dependence on a Fourier transformation. The Fourier transformation is suited to more effectively determine the image enhancement filter. Thereby the image enhancement filter for instance within a very short period of time can be generated and provided spontaneously upon recognizing the band-limiting malfunction of the camera. The image enhancement filter thereby is then determined in particular in the frequency space, whereby then the filter design generating the image enhancement filter can be performed more simply and more effectively.

The invention also relates to a camera system for a motor vehicle. The camera system comprises a camera, which has an object and an image sensor, and an evaluation unit. The camera system is configured to perform a method according to the invention. The camera system can also comprise several cameras. The evaluation unit can for instance be integrated within the camera or else be configured to be separate from the camera.

The camera in particular has a motor vehicle fastening element for fastening to the motor vehicle.

The invention also relates to a motor vehicle with a camera system according to the invention.

The preferred embodiments presented with reference to the method according to the invention and their advantages in analogy apply to the camera system according to the invention as well as to the motor vehicle according to the invention.

Further features of the invention derive from the claims, the figures, and the description of the figures. The features and feature combinations previously mentioned in the description as well as the features and feature combinations named in the following in the description of the figures and/or shown in the figures alone are employable not only in the respective indicated combination, but also in other combinations or taken alone, without leaving the scope of the invention. Thus, also embodiments of the invention are to be regarded as being comprised end disclosed, which are not explicitly shown and explained in the figures, but derive from and can be generated by separate feature combinations from the explained embodiments. Also embodiments and feature combinations are to be regarded as being disclosed, which thus do not have all features of an originally formulated independent claim.

Therein show:

FIG. 1 a schematic top view of an embodiment of a motor vehicle according to the invention comprising a camera system with a camera; and FIG. 2 a schematic representation of a measurement object and a point spread function generated in dependence thereon, which is determined on the basis of a brightness distribution of a measurement object shown in an image captured with the camera.

In the figures same elements or elements having the same functions are equipped with the same reference signs.

In FIG. 1 a motor vehicle 1 comprising a camera system 2 is schematically shown. The camera system 2 in the embodiment comprises a camera 3 and an evaluation unit 4. The evaluation unit 4 can for instance be integrated within the camera 3 or be configured to be separate from the camera 3.

The camera according to the embodiment is arranged on a front 5 of the motor vehicle 1. The arrangement of the camera 3, however, is possible in manifold ways, preferably, however, in such a way that the environmental area 6 of the motor vehicle 1 can be captured at least partly. Also, several cameras 3 can be arranged on the motor vehicle 1.

The camera 3 comprises an objective lens 7 and an image sensor 8. The image sensor 8 can for instance be configured as complementary metal-oxide semiconductor (CMOS) sensor or as charge-coupled device (CCD) sensor or as any other kind of image capturing unit. The camera 3 provides an image sequence of images of the environmental area 6. The image sequence of the images then is processed for instance in real time by the evaluation unit 4.

FIG. 2 shows a measurement object 9. The measurement object 9 according to the embodiment is arranged in the environmental area 6 of the motor vehicle 1. In an embodiment that is not further shown the measurement object 9, however, can also be arranged on a motor vehicle component of the motor vehicle 1. In the present case the measurement object 9 is provided as point-like perceptible light 10 of the luminous light source viewed from the camera 3. From the light source the light 10 is for instance radiated as complete spherical wave. The light 10 of the light source is cast upon a lens 11 of the objective lens 7 of the camera 3. From the lens 11 the light 10 hits the image sensor 8 of the camera 3. Thereby the measurement object 9 during capturing the image 12 is provided by means of the camera 3 arranged on the motor vehicle 1 as measurement object 13 shown in the image 12. On the basis of the shown measurement object 13 a point spread function 14 is determined.

The point spread function 14 in optics and image processing describes the effect of band-limiting influential factors. The influential factors can for instance be diffraction phenomena on diaphragms of the camera 3 and/or imaging errors of the camera 3 and/or a deficient sensor surface of the image sensor 8 and/or a deficient aperture of the camera 3. The point spread function 14 indicates how an idealized, dot-shaped object, in the present case the measurement object 9, is imaged by a system, in the present case the camera 3. The point spread function 14 accordingly can then be determined in the image 12 on the basis of the imaged measurement object 13.

The shown measurement object 13 can for instance be provided as test pattern and/or as luminous light source. Thus, the light source can be generated by an illumination unit of a further motor vehicle in the environmental area 6 of the motor vehicle 1 or the light source can be generated by a street lighting in the environmental area 6.

On the basis of the point spread function 14 a property value of a property of the camera 3 can be determined. The property of the camera 3 is characterized in particular through an achievable resolution of the camera. The achievable resolution provides information about how precisely details of the environmental area 6 can be captured with the camera 3. The achievable resolution can for instance be indicated with a unit of line pairs per millimetre for a certain distance. This means that through the achievable resolution it is described at how effective a resolution the camera 3 can capture the environmental area 6. In other words, in how much detail the environmental area 6 can be sampled by the camera 3 during capturing.

The achievable resolution of the camera 3 is then determined in dependence on the width 15 of a brightness distribution 16 along a profile through the brightest pixel of the measurement object 13 shown in the image 12. The achievable resolution of the camera 3 is in particular determined in dependence on the width 15 of the brightness distribution 16 half-way up the height between an intensity maximum 17 of the brightness distribution 16 and an intensity minimum 18 of the brightness distribution 16. It is understood that the smaller the width 15, the higher is the achievable resolution of the camera 3. This means that the width 15 therein can be envisaged as property value and be compared with the resolution threshold value. The resolution threshold value then is for instance a reference width of a reference point spread function. If the width 15 is larger than the reference width of the reference point spread function, the band-limiting malfunction of the camera 3 is recognized. Accordingly, recordings with the camera 3 can no longer be provided at the resolution, which remains below the resolution threshold value.

This means that the method in particular takes place as follows. During operation of the motor vehicle, i.e. In particular not under laboratory conditions, the image 12 of the measurement object 9 is captured by means of the camera 3. The profile is made to extend through the brightest pixel in the measurement object 13 shown in the image 12. Further the brightness distribution 16 along the profile is determined. Subsequently, the width 15 of the brightness distribution 16 is determined half-way up the height between the intensity maximum 17 and the intensity minimum 18. By the determined width 15 the currently achievable resolution of the camera 3 can be determined. If the achievable resolution remains below the resolution threshold value, the band limiting malfunction of the camera is recognized. Through recognizing the band-limiting malfunction it is also recognized that the camera 3 captures the environmental area 6 with a lower resolution than envisaged. As a consequence for instance an indication through the motor vehicle 1 can be issued or additionally or alternatively the image enhancement filter is generated or selected from an image processing filter collection. By means of the image processing filter then further images captured with the camera are adapted. By the adaptation of the further images by the image processing filter the further images with regard to the recognized band-limiting malfunction are corrected so that the effect of the band-limiting malfunction in the further images is suppressed. Thus the image 12 and/or the further images can be corrected by the image processing filter or be equipped with a raised sharpness degree. By the image processing filter accordingly an image sharpness of the image 12 and/or the further image can be increased after capturing.

This means that by determining the point spread function a resolution limit of the camera 3 can be determined. This resolution limit then is described by an airy disk, which is provided by the captured dot-shaped light source. The resolution threshold value can then for instance be characterized by the resolution limit of the camera 3, i.e. the limit, at which it can no longer be differentiated between different details provided by the environmental area.

In a further embodiment the point spread function is determined only if a change in the position of the motor vehicle is smaller than a change-in-position threshold value. This can be described as follows: In case the velocity of the motor vehicle 1 is smaller than a first change-in-position threshold value and a steering angle of the motor vehicle 1 is smaller than a second change-in-position threshold value, the determining of the point spread function 14 is performed.

In a similar way the change in the position of the motor vehicle 1 and/or the change in the position of the measurement object 9 can be performed by comparing single images of an image sequenced captured with the camera 3. This can for instance be described as follows: In case an amount of a central point of the measurement object 9 in a first single image of the image sequence minus the centre point of the measurement object 9 in a second single image of the image sequence is smaller than a third change-in-position threshold value, the determining of the point spread function 14 is performed.

On the basis of the point spread function 14 as already mentioned a property value of a property of the camera 3 is determined. The property can for instance be given as astigmatism and/or chromatic aberration and/or blur.

Upon application of the image enhancement filter then for instance once again a point spread function 14 can be determined by the image, which is adapted by the image enhancement filter. Thereby it can be checked whether the effect of the image enhancement filter has occurred as desired.

In a further embodiment the method for recognizing the band limiting malfunction is performed each time automatically, in case predetermined conditions are given. The predetermined conditions can for example be given, in case darkness prevails in the environmental area 6, i.e. for instance a brightness in the environmental area 6 remains below a brightness threshold value. The brightness in the environmental area 6 can for instance be determined by means of brightness sensors of the motor vehicle 1. As brightness sensor for instance a sensor of an automatic light sensor and/or an interior light dimming sensor and/or a mirror dimming sensor can be used. Additionally or alternatively an exposure time and/or a sensor amplification of the camera 3 can be used.

Further additionally or alternatively for instance a percentage of essentially black pixels in the image 12 can be used, in order to check whether the conditions for determining the point spread function 14 are given.

The invention claimed is:

1. A method for recognizing a band-limiting malfunction of a camera of a motor vehicle, the method comprising:
capturing, during operation of the motor vehicle, an image of a measurement object external to the motor vehicle, by the camera arranged on the motor vehicle;
determining, in the image, a point spread function on the basis of a brightness distribution along a profile through a pixel with a brightness, which exceeds a brightness threshold value, of the measurement object shown in the image; and
on the basis of the determined point spread function, determining a property value of a property of the camera, and recognizing the band-limiting malfunction of the camera, in case the property value of the camera is smaller than a property threshold value.

2. The method according to claim 1, wherein the brightness distribution along a profile is determined through the brightest pixel of the measurement object shown in the image.

3. The method according to claim 1, further comprising determining, as the property of the camera, an achievable resolution of the camera, and recognizing the band-limiting malfunction of the camera, in case the achievable resolution of the camera, which represents a property value, is smaller than a resolution threshold value characterizing the property threshold value.

4. The method according to claim 3, wherein the achievable resolution of the camera is determined in dependence on a width of the brightness distribution half-way up the height between the intensity maximum of the brightness distribution and the intensity minimum of the brightness distribution.

5. The method according to claim 1, wherein the measurement object is provided as a test pattern and/or as light, radiated in a dot-shaped manner, of a luminous light source.

6. The method according to claim 5, wherein the test pattern is provided in an environmental area of the motor vehicle and/or is arranged on a motor vehicle component of the motor vehicle.

7. The method according to claim 5, wherein the light of the light source is generated by an illumination unit of a further motor vehicle in an environmental area of the motor vehicle and/or is generated by a street lighting in the environmental area.

8. The method according to claim 1, wherein a change in the position of the motor vehicle and/or a change in the position of the measurement object is determined, and the image of the measurement object is only captured, in case the change in the position of the motor vehicle and/or the change in the position of the measurement object is smaller than a change-in-position threshold value.

9. The method according to claim 1, wherein the measurement object shown in the image is determined automatically by means of a method of machine vision in the image.

10. The method according to claim 1, further comprising generating, on the basis of the determined property value, an image enhancement filter for the camera, wherein at least one further image consecutive to the image is adapted by the image enhancement filter.

11. The method according to claim 1, further comprising selecting, on the basis of the determined property value, an image enhancement filter for the camera from an image processing filter collection, wherein at least one further image consecutive to the image is adapted by the image enhancement filter.

12. The method according to claim 10, wherein the image enhancement filter is determined in dependence on a Fourier transformation.

13. A camera system for a motor vehicle, comprising:
a camera, which comprises an objective lens and an image sensor; and
an evaluation unit, which is configured for performing a method according to claim 1.

14. A motor vehicle comprising a camera system according to claim 13.

* * * * *